(12) United States Patent
Reiffel

(10) Patent No.: US 7,034,803 B1
(45) Date of Patent: Apr. 25, 2006

(54) CURSOR DISPLAY PRIVACY PRODUCT

(76) Inventor: Leonard Reiffel, 602 Deming Pl., Chicago, IL (US) 60614

( * ) Notice: Subject to any disclaimer, the term of this patent is extended or adjusted under 35 U.S.C. 154(b) by 531 days.

(21) Appl. No.: 10/344,457

(22) PCT Filed: Sep. 19, 2000

(86) PCT No.: PCT/US00/25703

§ 371 (c)(1),
(2), (4) Date: Feb. 11, 2003

(87) PCT Pub. No.: WO02/17291

PCT Pub. Date: Feb. 28, 2002

Related U.S. Application Data

(60) Provisional application No. 60/226,183, filed on Aug. 18, 2000.

(51) Int. Cl.
*G09G 5/08* (2006.01)
(52) U.S. Cl. ............ 345/157; 345/156; 715/856
(58) Field of Classification Search ........ 345/156, 345/157, 163; 715/856, 857, 858
See application file for complete search history.

(56) References Cited

U.S. PATENT DOCUMENTS

| | | | |
|---|---|---|---|
| 4,053,233 A | 10/1977 | Bien et al. |
| 4,099,050 A | 7/1978 | Sauermann |
| 4,228,430 A | 10/1980 | Iwamura et al. |
| 4,439,672 A | 3/1984 | Salaman |
| 4,603,231 A | 7/1986 | Reiffel et al. |
| 4,637,797 A | 1/1987 | Whitney et al. |
| 4,650,334 A | 3/1987 | Alster et al. |
| 4,684,349 A | 8/1987 | Ferguson et al. |
| 4,945,914 A | 8/1990 | Allen |
| 4,998,441 A | 3/1991 | Stuart |
| 5,107,350 A | 4/1992 | Omori |
| 5,111,410 A | 5/1992 | Nakayama et al. |
| 5,181,015 A | 1/1993 | Marshall et al. |
| 5,214,414 A | 5/1993 | Levine et al. |
| 5,260,556 A | 11/1993 | Lake et al. |
| 5,282,045 A | 1/1994 | Mimura et al. |
| 5,415,553 A | 5/1995 | Szmidla |
| 5,448,261 A | 9/1995 | Koike et al. |
| 5,453,015 A | 9/1995 | Vogel |
| 5,507,527 A | 4/1996 | Tomioka et al. |
| 5,537,211 A | 7/1996 | Dial |
| 5,563,401 A | 10/1996 | Lemelson |
| 5,644,126 A | 7/1997 | Ogawa |
| 5,710,416 A | 1/1998 | Belknap et al. |
| 5,712,658 A | 1/1998 | Arita et al. |
| 5,729,220 A | 3/1998 | Russell |

(Continued)

FOREIGN PATENT DOCUMENTS

EP          0 062 473          10/1982

(Continued)

*Primary Examiner*—Regina Liang
*Assistant Examiner*—Jennifer T. Nguyen
(74) *Attorney, Agent, or Firm*—Hallihan Intellectual Property Law; Don Mayer; William Hallihan

(57) ABSTRACT

The privacy product—used with an information system which has a data processor (71) signal connected (72) to a display device (81) and has an input device (51, 51A) signal connected (52, 52A) to the data processor with the input device being manipulated (21) by a person to control cursor motions—comprises a computer readable signal bearing medium (11) signal connected (14) to the data processor with the medium having a chaff component (12) which causes the data processor to cause the display device to display (82) a chaff path (31A) which is indistinguishable from the cursor path (31) by a sequent person.

8 Claims, 1 Drawing Sheet

U.S. PATENT DOCUMENTS

| | | | |
|---|---|---|---|
| 5,789,732 | A | 8/1998 | McMahon et al. |
| 5,795,161 | A | 8/1998 | Vogel |
| 5,821,523 | A | 10/1998 | Bunte et al. |
| 5,822,735 | A | 10/1998 | De Lapa et al. |
| 5,825,045 | A | 10/1998 | Koenck et al. |
| 5,826,578 | A | 10/1998 | Curchod |
| 5,835,237 | A | 11/1998 | Ebrahimi |
| 5,852,211 | A | 12/1998 | Dumpelmann et al. |
| 5,852,823 | A | 12/1998 | De Bonet |
| 5,867,265 | A | 2/1999 | Thomas |
| 5,900,869 | A * | 5/1999 | Higashio .................... 715/751 |
| 5,912,700 | A | 6/1999 | Honey et al. |
| 5,917,472 | A | 6/1999 | Perala |
| 5,917,486 | A * | 6/1999 | Rylander .................... 715/764 |
| 5,963,145 | A | 10/1999 | Escobosa |
| 5,982,352 | A | 11/1999 | Pryor |
| 5,988,505 | A | 11/1999 | Shellhammer |
| 5,990,872 | A * | 11/1999 | Jorgenson et al. .......... 345/168 |
| 6,000,612 | A | 12/1999 | Xu |
| 6,047,893 | A | 4/2000 | Saporetti |
| 6,048,117 | A | 4/2000 | Banton |
| 6,056,199 | A | 5/2000 | Wiklof et al. |
| 6,082,619 | A | 7/2000 | Ma et al. |
| 6,118,848 | A | 9/2000 | Reiffel |
| 6,121,958 | A | 9/2000 | Clark et al. |
| 6,155,489 | A | 12/2000 | Collins, Jr. et al. |
| 6,163,946 | A | 12/2000 | Pryor |
| 6,167,607 | B1 | 1/2001 | Pryor |
| 6,301,763 | B1 | 10/2001 | Pryor |
| 6,311,214 | B1 | 10/2001 | Rhoads |
| 6,314,631 | B1 | 11/2001 | Pryor |
| 6,317,118 | B1 | 11/2001 | Yoneno |
| 6,317,188 | B1 | 11/2001 | Shibahara |
| 6,317,953 | B1 | 11/2001 | Pryor |
| 6,330,973 | B1 | 12/2001 | Bridgelall et al. |
| 6,335,685 | B1 | 1/2002 | Schrott et al. |
| 6,542,083 | B1 | 4/2003 | Richley et al. |
| 6,545,670 | B1 | 4/2003 | Pryor |
| 6,708,885 | B1 | 3/2004 | Reiffel |
| 6,720,949 | B1 | 4/2004 | Pryor et al. |
| 6,750,848 | B1 | 6/2004 | Pryor |
| 6,766,036 | B1 | 7/2004 | Pryor |
| 2002/0036617 | A1 | 3/2002 | Pryor |
| 2002/0183961 | A1 | 12/2002 | French et al. |
| 2003/0222145 | A1 | 12/2003 | Reiffel |
| 2004/0027455 | A1 | 2/2004 | Reiffel |
| 2004/0041027 | A1 | 3/2004 | Reiffel |
| 2004/0125224 | A1 | 7/2004 | Reiffel |
| 2004/0135766 | A1 | 7/2004 | Reiffel |
| 2004/0188525 | A1 | 9/2004 | Reiffel |
| 2004/0195327 | A1 | 10/2004 | Reiffel |

FOREIGN PATENT DOCUMENTS

| | | |
|---|---|---|
| EP | 0 840 248 | 5/1998 |
| EP | 1 020 810 | 7/2000 |
| FR | 2 694 827 | 2/1994 |
| JP | 11-143629 | 5/1999 |
| WO | WO 87/07106 | 11/1987 |
| WO | WO 93/18478 | 9/1993 |
| WO | WO 96/32690 | 10/1996 |
| WO | WO 99/36836 | 7/1999 |
| WO | WO 99/66441 | 12/1999 |
| WO | WO 01/71397 | 9/2001 |
| WO | WO 01/84475 | 11/2001 |
| WO | WO 02/17037 | 2/2002 |
| WO | WO 02/17293 | 2/2002 |
| WO | WO 02/48947 | 6/2002 |
| WO | WO 02/49340 | 6/2002 |
| WO | WO 02/49344 | 6/2002 |
| WO | WO 02/086807 | 10/2002 |

\* cited by examiner

CURSOR DISPLAY PRIVACY PRODUCT

This application claims benefit of international application PCT/US00/25703 filed on Sep. 19, 2000 which claims benefit of 60/226,183 Aug. 18, 2000.

BACKGROUND

The privacy product causes an information system to display chaff paths so that—while a person controlling a cursor motion can recognize cursor motions—onlookers can not recognize cursor motions amidst chaff paths.

The invention provides progress over prior art shown for example in U.S. Pat. Nos. 3,671,668 and 3,718,759 by Reiffel.

DRAWINGS

DESCRIPTION

Figure 1:
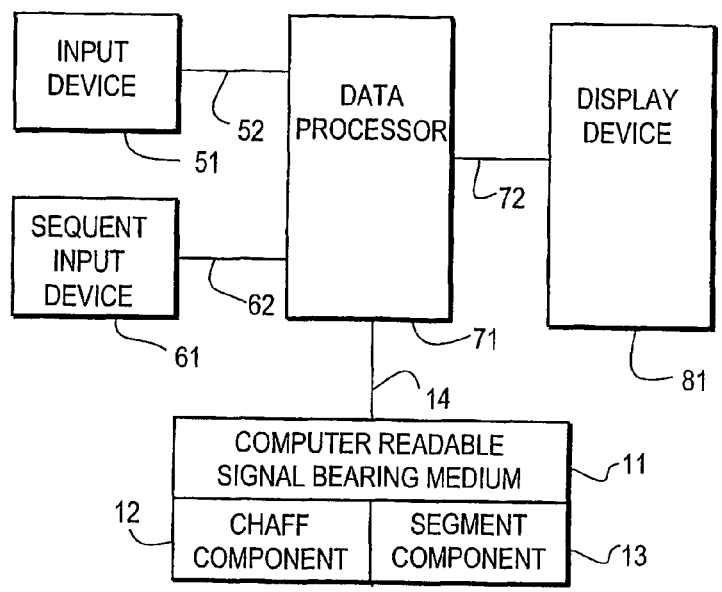
FIG. 1 depicts the product schematically.

The privacy product—depicted schematically in FIG. 1—is used with an information system which has a data processor 71 signal connected 72 to a display device 81 and has an input device 51 signal connected 52 to the data processor. The input device is manipulated by a person to control cursor motions.

"Signal connected" here and throughout means that signals pass between signal connected devices.

The input device sends a motion signal to the data processor which the data processor uses to generate a cursor component of a display signal sent to the display device. The cursor component causes the display device to display a cursor path representing cursor motions.

The privacy product comprises a computer readable signal bearing medium 11 signal connected 14 to the data processor. The medium has a chaff component 12 which causes the data processor to add a chaff component to the display signal. The chaff component causes the display device to display a chaff path which is indistinguishable from the cursor path by a sequent person.

The clause "indistinguishable from the cursor path" means that there is no property of the chaff path, nor of the cursor path, distinguishable by anyone other than the person controlling cursor motions by which anyone other than the person controlling the cursor could tell which of the chaff path and the cursor path is the cursor path.

The information system can have a sequent input device 61 signal connected 62 to the data processor with the sequent input device being manipulated by a sequent person to control sequent cursor motions. The sequent input device sends a sequent motion signal to the data processor which the data processor uses to generate a sequent cursor component of the display signal sent to the display device. The sequent cursor component of the signal causes the display device to display a sequent cursor path representing sequent cursor motions.

Here the chaff component of the medium also causes the data processor to add a sequent chaff component to the display signal which causes the display device to display a sequent chaff path which is indistinguishable from the cursor path by the person.

There can also be a segment component 13 of the medium which causes the data processor to segment the cursor component of the display signal so that the cursor component causes the display device to display cursor path segments and sequent cursor path segments when a sequent input device is operating.

Figure 2:
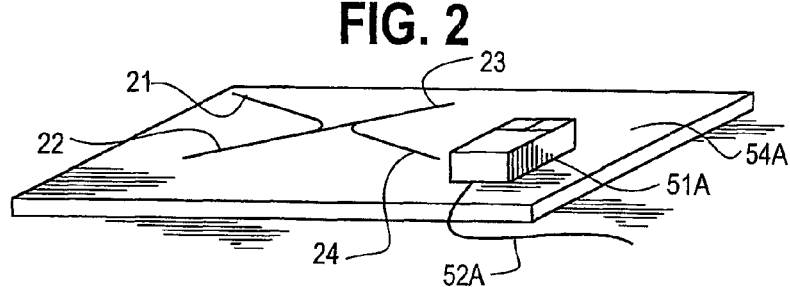
FIG. 2 depicts the path of an input device controlling a cursor.

The input device 51 is depicted in FIG. 2 as a computer mouse 51A signal connected 52A to the data processor and moving on a mouse pad 54A. Here the mouse has completed motions beginning by heading diagonally 21 toward a center, turning to head diagonally away 22 from the center, returning diagonally to and past 23 the center, returning diagonally toward the center, and turning to head diagonally away 24 from the center.

Figure 3:
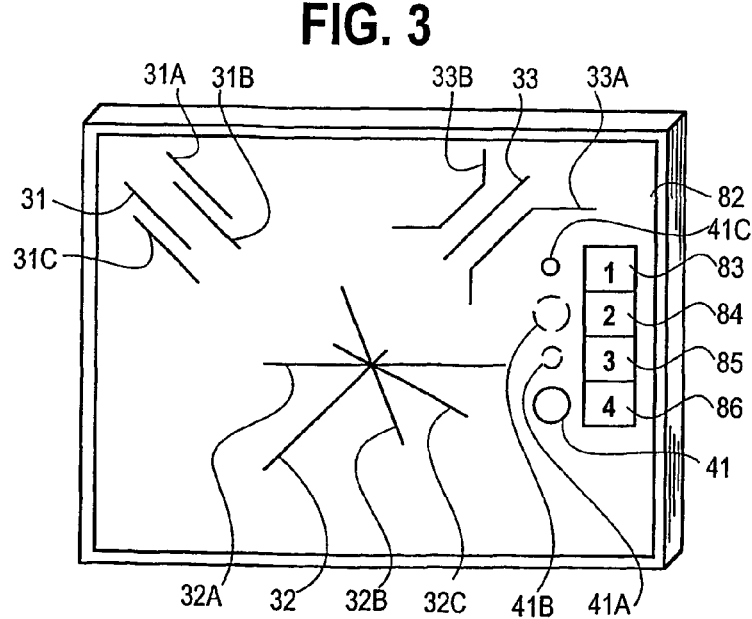
FIG. 3 depicts a display of a segmented cursor path and chaff paths.

A display device screen 82 display is depicted in FIG. 3. On the screen a first cursor path segment 31 representing a first cursor motion segment about 21 is displayed along with several chaff paths 31A, 31B, 31C. Also, a second cursor path segment 32 representing a second cursor motion segment about 22 is displayed along with several chaff paths 32A, 32B, 32C, and a third cursor path segment 33 representing a third cursor motion segment about 23 is displayed along with several chaff paths 33A, 33B.

The person controlling the input device can tell which among cursor path segments and chaff paths represents cursor motion segments because of the correspondence between manipulation of the input device and the cursor path segment. A sequent person—who is not controlling the cursor motion—can not distinguish the cursor path segments amidst the chaff paths.

Symmetrically, a sequent person controlling a sequent input device can tell which among sequent cursor path segments and all chaff paths represents sequent cursor motion segments because of the correspondence between manipulation of the sequent input device and the sequent path segment. The person—who is not controlling the sequent cursor motion—can not distinguish the sequent cursor path segments amidst all chaff paths.

Because the situation is symmetric relative to exchange of "person" and "sequent person," sequent cursor path segments and sequent chaff paths are not depicted. Though the paths depicted are segmented by the segment component of the medium, the segment component could be left off so that the cursor paths would be unsegmented. This is not depicted because it is clear what the unsegmented cursor path would be. In the case without the segment component, chaff paths can create a jumble which if depicted would be a jumble.

A display of a cursor path can be a display of the cursor only, can be a display of a line representing motions of the cursor, and can be combinations of these. A display of a chaff path can be a display of a chaff cursor only, can be a display of a line comprising the chaff path, and can be combinations of these.

In FIG. 3 a displayed cursor is depicted 41 as about to enter a displayed location 86. Displayed chaff cursors—41A, 41B, 41C—are about to enter locations 85, 84, 83. Again while the person can tell that the displayed cursor is entering a location, the sequent person can not tell this amid the chaff.

The medium can cause the displayed cursor and chaff cursors to blink at the same and different rates and can cause the displayed cursor and chaff cursors to change shapes according to a relationship and at random. A person controlling cursor motions can control cursor blinks and shape changes.

Cursor blinks and shape changes are depicted in FIG. 3. The cursor 41 is a circle blinked on, a first chaff cursor 41A has changed shape to a small circle and has blinked off, a second chaff cursor 41B changed shape to a larger circle and blinked off, and a third chaff cursor 41C has changed shape to a smaller circle and blinked on.

Sounds can accompany the display of any, and all, of the displayed paths. Sounds accompanying display of a cursor path—including blinks and shape changes—can be controlled by the person controlling cursor motions. Sounds can be caused by the medium. Tactile signals corresponding to sounds accompanying a cursor path can be caused to be sent to the input device controlling cursor motions.

The symmetry between the person, and the sequent person extends to symmetries between all pairs in a plurality of sequent persons. Each controls distinct motions via distinct input devices. Each can control distinct cursor blinks and cursor shape changes via distinct input devices. For each of the motions (and cursor blinks and shape change, if present), the chaff component can cause endless variations of chaff paths, cursor and chaff cursor blinks, cursor and chaff cursor shape changes, and combinations of these.

The data processor can be a special purpose data processor, can be a general purpose data processor, can be stand-alone, can be part of a network, and can be stand-alone and part of a network in alternate time intervals.

The computer-readable signal-bearing medium can be a transmitted signal, a data storage medium, and a combination of a transmitted signal and a data storage medium.

The transmitted signal can be any of various point-to-point and broadcast forms of energy transmission—wireless and via wires, cables, and fibers—known in the art. Parts of the signal can reside with one form of the transmitted signal, parts can reside with a second form of transmitted signal, and parts can reside with various combinations of transmitted signals.

The data storage medium can be any of various mechanical, electrical, magnetic, optical, molecular, atomic, and quantum data storage media known in the art. Parts of the computer-readable signal can reside with a data storage medium, parts can reside with a second data storage medium, parts can reside with the transmitted signal, parts can reside with a second transmitted signal, and parts can reside with various combinations data storage media and transmitted signals.

Though an input device is depicted as a conventional computer mouse, any input device—including sound activated devices—which can be signal connected to a data processor can be used. For example, the input devices disclosed in international patent application PCTUS0007538 and U.S. patent applications 60211471 and 60226183 can be used.

The cursor display privacy product is especially useful for entering private information—such as a personal identification number—where onlookers could otherwise see the information. Several specific applications are disclosed in international patent application PCTUS0021518 and in U.S. patent application 60226183.

What is claimed is:

1. A privacy product used with an information system, the information system comprising:
   a data processor;
   a display device signal connected to the data processor; and
   an input device signal connected to the data processor, the input device being manipulated by a person to control cursor motions, the input device sending a motion signal to the data processor, the data processor using the motion signal to generate a cursor component of a display signal sent to the display device, the cursor component causing the display device to display a cursor path representing cursor motions;
   the privacy product comprising:
   a computer readable signal bearing medium signal connected to the data processor; and
   a chaff component of the medium, the chaff component causing the data processor to add a chaff component to the display signal, the chaff component causing the display device to display a chaff path which is indistinguishable from the cursor path by a sequent person.

2. The product of claim 1 wherein the cursor path comprises a blinking cursor and the chaff path comprises a blinking chaff cursor.

3. The product of claim 2 wherein the blinking cursor changes shape and the blinking chaff cursor changes shape.

4. The product of claim 1 wherein the cursor path comprises a shape changing cursor and the chaff path comprises a shape changing chaff cursor.

5. The product of claim 1 further comprising a segment component of the medium, the segment component causing the data processor to segment the cursor component of the display signal so that the cursor component causes the display device to display cursor path segments representing cursor motion segments.

6. A privacy product used with an information system, the information system comprising:
   a data processor;
   a display device signal connected to the data processor;
   an input device signal connected to the data processor, the input device being manipulated by a person to control cursor motions, the input device sending a motion signal to the data processor, the data processor using the motion signal to generate a cursor component of a display signal sent to the display device, the cursor component causing the display device to display a cursor path representing cursor motions; and
   a sequent input device signal connected to the data processor, the sequent input device being manipulated by a sequent person to control sequent cursor motions, the sequent input device sending a sequent motion signal to the data processor, the data processor using the sequent motion signal to generate a sequent cursor component of the display signal, the sequent cursor component causing the display device to display a sequent cursor path representing sequent cursor motions;
   the privacy product comprising:
   a computer readable signal bearing medium signal connected to the data processor; and
   a chaff component of the medium, the chaff component causing the data processor to add a chaff component to the display signal, the chaff component causing the display device to display a chaff path which is indistinguishable from the cursor path by the sequent person, and the chaff component causing the display device to display a sequent chaff path which is indistinguishable from the sequent cursor path by the person.

7. The product of claim 6 further comprising a segment component of the medium, the segment component causing the data processor to segment the cursor component of the display signal and to segment the sequent cursor component of the signal so that the display signal causes the display device to display cursor path segments and sequent cursor path segments representing cursor motion segments and sequent cursor motion segments.

8. A privacy product used with an information system, the information system comprising:
- a data processor;
- a display device signal connected to the data processor;
- an input device signal connected to the data processor, the input device being manipulated by a person to control cursor motions, the input device sending a motion signal to the data processor, the data processor using the motion signal to generate a cursor component of a display signal sent to the display device, the cursor component causing the display device to display a cursor path representing cursor motions; and
- a sequent input device signal connected to the data processor, the sequent input device being manipulated by a sequent person to control sequent cursor motions, the sequent input device sending a sequent motion signal to the data processor, the data processor using the sequent motion signal to generate a sequent cursor component of the display signal, the sequent cursor component causing the display device to display a sequent cursor path representing sequent cursor motions;

the privacy product comprising:
- a computer readable signal bearing medium signal connected to the data processor;
- a chaff component of the medium, the chaff component causing the data processor to add a chaff component to the signal, the chaff component causing the display device to display a chaff path which is indistinguishable from the cursor path by the sequent person, and the chaff component causing the display device to display a sequent chaff path which is indistinguishable from the sequent cursor path by the person; and
- a segment component of the medium, the segment component causing the data processor to segment the cursor component of the signal and to segment the sequent cursor component of the signal so that the display signal causes the display device to display cursor path segments and sequent cursor path segments representing cursor motion segments and sequent cursor motion segments.

* * * * *